United States Patent [19]

Akatsuka et al.

[11] 4,093,748

[45] June 6, 1978

[54] PROCESS FOR THE PREPARATION OF BREAD

[75] Inventors: Shin-Ichiro Akatsuka, Tokorozawa; Shozo Akutsu, Komae; Michio Uchida, Yokohama, all of Japan

[73] Assignee: Eisai Co., Ltd., Tokyo, Japan

[21] Appl. No.: 754,264

[22] Filed: Dec. 27, 1976

[30] Foreign Application Priority Data

Dec. 27, 1975 Japan .................................. 50-155755

[51] Int. Cl.$^2$ .......................... A21D 2/08; A21D 2/34
[52] U.S. Cl. ........................................ 426/19; 426/20; 426/23
[58] Field of Search ...................... 426/19, 20, 23, 32, 426/60

[56] References Cited

U.S. PATENT DOCUMENTS

| | | | |
|---|---|---|---|
| 1,160,783 | 11/1915 | Sulzberger | 426/549 |
| 2,920,965 | 1/1960 | Ziegler et al. | 426/19 X |
| 3,738,841 | 6/1973 | Toscano | 426/19 |

*Primary Examiner*—Raymond N. Jones
*Assistant Examiner*—Esther M. Kepplinger
*Attorney, Agent, or Firm*—Wenderoth, Lind & Ponack

[57] ABSTRACT

Process for the preparation of a loaf of bread, in which yeast extract, or a mixture of the yeast extract and hydrolyzed egg white is added to wheat flour, and then the material is kneaded, fermented and baked in accordance with conventional procedures. According to this invention, the time for baking is reduced and the resulting bread has good qualities improved in external appearance, crumb, flavor and compressibility.

7 Claims, No Drawings

PROCESS FOR THE PREPARATION OF BREAD

This invention relates to a process for the preparation of bread. More particularly, this invention relates to an improvement of said process which comprises adding yeast extract, or a mixture of the yeast extract and hydrolyzed egg white to wheat flour, so as to reduce the period of time required for the preparation of the bread and to improve the quality of the bread.

Recently, breads have been made remarkably popular. Bread is, of course, more flavorful to eat as soon as it is baked. For this reason, bakers usually work daily from early morning until late in the day, and this labor involves considerable hard work. There have been heretofore studied several methods for reducing the period of time for the preparation of bread. However, a satisfactory method has not as yet been found, because it is difficult to reduce the preparation, without degradation of the quality.

We studied the reduction of the period of time for preparing the breads, and found that one may not only reduce the period of time, but also improve the quality, when bread is prepared by adding yeast extract or a mixture of the yeast extract and hydrolyzed egg white to wheat flour. This invention has been achieved on the basis of said discovery. In addition, there has been produced, according to this invention, bread having
1. Improved external appearance, especially richer golden brown crust color.
2. Improved crumb characteristics, with more even and fine grains and thinner cell walls, therefore, improved eating quality.
3. Improved flavor with richer fragrance of crust.
4. Retarded staling.

This invention is therefore directed to a process for the preparation of a load of bread which comprises adding yeast extract or a mixture of the yeast extract and hydrolyzed egg white to wheat flour, then kneading, fermenting and baking according to conventional procedures.

The process of this invention is applied to the preparation of bread by dough fermentation such as the sponge and dough method, a straight dough method, and the like. According to this invention, there are included breads such as so-called white bread, French rolls; sweet goods, such as jam buns, cream buns, beam-jam buns; and other breads such as fruit breads, continental breads, Danish pastries, a fermented doughnuts and the like.

The yeast extract to be used with this invention, represents the products which were obtained by chemically, physically or biologically breaking the cell wall of other varieties than bakers's yeasts (*Saccharomyces cerevisiae*) to be used for the preparation of bread, i.e., yeasts such as the beer-yeast, the sake-yeast, the soy-yeast, the wine-yeast and the like. Commercially available yeast extracts are a self-digested yeast or an essence of yeast.

The hydrolyzed egg white may be a product resulting from the hydrolysis of egg-albumen by acid or by enzyme.

The fermentation of the bread yeast is accelerated by the addition of the yeast extract and the hydrolyzed egg white, whereby the period of time for dough fermentation may be reduced. The sponge and dough method, for example, the period of time for the fermentation is reduced to about 3 hours, although it usually requires 4 hours. In addition, the period of time for the kneading and the baking of dough may be reduced.

Moreover, the yeast extracts have the effect not only of accelerating the maturing of the dough and increasing the elasticity of the dough, but they also improve the quality of the bread on volume, color of crust, porosity or grain, touch, flavor, and the like.

On the other hand, the hydrolyzed egg white increases the elongation of dough, and also improves the quality of the bread on color of crust, touch, flavor, and the like.

It is possible to obtain bread having good quality by adding solely the yeast extract, as compared with the bread having no yeast extract. However, there can be obtained bread having better qualities and good balance by adding both the yeast extract and the hydrolyzed egg white.

The amount of the yeast extracts to be added varies with the kind of bread and the yeast extract itself. It is generally preferable to use about 0.01 – 0.3% of the yeast extract on the basis of the total amount of the wheat flour.

When said two additives are used, the ratio of the amount to be added of the yeast extract, to that of the hydrolyzed egg white is most preferably in the range of from 0.025% : 0.5% to 0.075% : 1.5% on the basis of the total amount of wheat flour.

By means of the process of this invention, there have been simultaneously dissolved the two most important problems in the art, that is, the reduction of the period of time for the production and the improvement of the qualities of the bread. The process is very useful from a commercial point of view.

This invention will be illustrated more in detail by the following examples.

EXAMPLE

Process for the preparation of bread by sponge and dough method

1. Sample
   Yeast extract (essence of the beer yeast)
   Hydrolyzed egg white (a power of hydrolysis products by hydrochloric acid, containing 20% of sodium chloride)
2. Amount of sample added (on the basis of the total amount of the wheat flour)
   Yeast extract : 0, 0.025, 0.05, 0.075%
   Hydrolyzed egg white : 0, 0.5, 1.0, 1.5%
3. Method of test
   (1) Process for the preparation : 70% sponge and dough method
   (2) Formulation of materials:

| Material | Property and brand | Sponge and dough | Dough | Total |
|---|---|---|---|---|
| Wheat flour | Quasi-first grade high-power flour | 70.0% | 30.0% | 100.0% |
| Water | Tap water | Proper amount | Proper amount | Proper amount |
| Yeast | Compressed | 2.0% | — | 2.0% |
| Salt | Salt of the Pharmacopoeia | — | 2.0% | 2.0% |
| Sugar | Granulated sugar | — | 4.0% | 4.0% |
| Shortening | Crisco | — | 4.0% | 4.0% |
| Potassium bromate | Potassium bromate of the Pharmacopoeia | 3 ppm | — | 3 ppm |
| Yeast extract | Sample | 0 – 0.075% | — | 0 – 0.075% |

-continued

| Material | Property and brand | Sponge and dough | Dough | Total |
|---|---|---|---|---|
| Hydrolyzed egg white | Sample | 0 – 1.5% | — | 0 – 1.5% |

(3) Steps for the preparation
 Sponge and dough kneading:
  Low speed for 1.5 minutes; temperature is 24° C.
 Sponge and dough fermentation:
  Room temperature (29 ± 1° C.), for 3 or 4 hours; temperature at the end of fermentation is 29° C.
 Kneading of dough:
  Low speed for 1.5 minutes; high speed for 1.25 – 2.25 minutes; temperature of kneaded dough is 29° C.
 Floor time:
  30 minutes
 Finishing:
  Dividing, Rounding
   450g of the divided weight of the dough is folded into three, so as to face the area contacted with the fermentation vessel, divided from both ends, passed once to rolls with a gap of ⅜inch and rounded twice with folding in three.
  maturing . . . at 29 ± 1° C. for 15 minutes.
  Arranging the form . . . The matured dough is once passed through rolls with respective gaps of ⅜ inch and 7/32 inch in the same direction, and then passed once through rolls with gap of ⅛ inch in the opposite direction, by turning 180°.
  Said dough is curled by centering the dry end itself, and rolled 10 times under pressure in a molder to arrange the form.
  Form . . . One load type
   mold . . Top side size : 20.4 – 20.6 cm × 9.7 – 9.9 cm.
   Bottom side size : 18.8 – 19.0 cm × 8.4 – 8.6 cm.
   Depth : 7.6 – 8.2 cm.
   Volume : about 1,440 cm$^3$
  Oven . . . 39 ± 1° C.
   Relative humidity: more than 90%.
   The required time for the top of the dough to attain 2.0 cm over the upper edge of the mold : 50 –63 minutes.
  Baking:
   Baking . . . at 227 ± 3° C. for 23 minutes. The weight and volume just after being taken out of the oven are measured.
   Cooling . . . After cooling at room temperature for 1 hour, the resulting products are preserved in a bag made of polyethylene. The next day, the products are subjected to the determination of compressibility and the examination of the products
(4) Examination of the resulting products (Comparative grading examination by the five senses)
 Appearance (30): Volume (10), Color of surface(10),
 Balance of form (5), Quality of crust (5) Interior crumb (70): Interior color (10), Grain (10), Touch (10), Flavor (10), Taste (25)
(5) Compressiblity
 Plunger area: 3.2 cm × 3.2 cm = 10.24 cm$^2$ At the upper, middle and lower parts of each slice, stresses for the strains of 1.5, 2.0 and 3.0 mm, are respectively represented in grams.

| Result of the test | | | | | | | | |
|---|---|---|---|---|---|---|---|---|
| Added amount of the yeast extract (%) | 0 (control) | | 0.025 | | | | | |
| Added amount of the hydrolyzed egg white (%) | 0 (control) | 0 | 0.5 | 1.0 | 1.5 | | | |
| sponge and dough fermentation time (hours) | 4 | 3 | 3 | 3 | 3 | 3 | | |
| Kneading time for dough (minutes) | 2¼ | 2⅛ | 2 | 2 | 1⅞ | 1¾ | | |
| Oven time (minutes) | 60 | 63 | 58 | 55 | 53 | 52 | | |
| Weight just after baking (g) | 392 | 393 | 391 | 390 | 389 | 389 | | |
| Volume just after baking (cc) | 2,350 | 2,200 | 2,390 | 2,440 | 2,460 | 2,460 | | |
| Grain | 599 | 560 | 611 | 626 | 632 | 632 | | |
| Marking in the examination of the resulting bread — Appearance — Volume | 9.98 | 9.30 | 10.00 | 10.00 | 10.00 | 10.00 | | |
| Color of the crust | 9.50 | 9.45 | 9.60 | 9.95 | 10.00 | 10.00 | | |
| Balance of the form | 5.00 | 4.75 | 5.00 | 5.00 | 5.00 | 5.00 | | |
| Quality of the crust | 4.85 | 4.60 | 5.00 | 5.00 | 5.00 | 5.00 | | |
| Subtotal of appearance | 29.33 | 28.10 | 29.60 | 29.95 | 30.00 | 30.00 | | |
| Added amount of the yeast extract (%) | | 0.05 | | | | 0.075 | | |
| Added amount of the hydrolyzed egg white (%) | 0 | 0.5 | 1.0 | 1.5 | 0 | 0.5 | 1.0 | 1.5 |
| Sponge and dough fermentation time (hours) | 3 | 3 | 3 | 3 | 3 | 3 | 3 | 3 |
| Kneading time for dough (minutes) | 1¾ | 1⅝ | 1⅝ | 1½ | 1½ | 1½ | 1⅜ | 1¼ |
| Oven time (minutes) | 57 | 53 | 51 | 50 | 57 | 53 | 51 | 50 |
| Weight just after baking (g) | 389 | 389 | 389 | 390 | 389 | 390 | 390 | 390 |
| Volume just after baking (cc) | 2,410 | 2,500 | 2,550 | 2,500 | 2,420 | 2,520 | 2,550 | 2,490 |
| Grain | 620 | 643 | 656 | 641 | 622 | 646 | 656 | 638 |
| Marking in the Examination of the resulting bread — Apperance — Volume | 10.00 | 10.00 | 10.00 | 10.00 | 10.00 | 10.00 | 10.00 | 10.00 |
| Color of the crust | 9.65 | 10.00 | 10.00 | 10.00 | 9.65 | 10.00 | 10.00 | 9.97 |
| Balance of the form | 5.00 | 5.00 | 5.00 | 5.00 | 5.00 | 5.00 | 5.00 | 5.00 |
| Quality of the crust | 5.00 | 5.00 | 5.00 | 5.00 | 5.00 | 5.00 | 5.00 | 5.00 |

-continued

| | | | | | | | | | |
|---|---|---|---|---|---|---|---|---|---|
| Subtotal of appearance | | | 29.65 | 30.00 | 30.00 | 30.00 | 29.65 | 30.00 | 30.00 | 29.97 |

| | | | Col1 | Col2 | Col3 | Col4 | Col5 | Col6 |
|---|---|---|---|---|---|---|---|---|
| Added amount of the yeast extract (%) | | | 0 (control) | | 0.025 | | | |
| Added amount of the hydrolyzed egg white (%) | | | 0 (control) | 0 | 0.5 | 1.0 | 1.5 | |
| Marking in the Examination of the resulting bread | | Interior hue | 10.00 | 9.70 | 10.00 | 10.00 | 10.00 | 9.95 |
| | | Grain | 9.70 | 9.20 | 9.97 | 10.00 | 10.00 | 9.95 |
| | Crumb | Touch | 14.25 | 13.50 | 14.40 | 14.85 | 15.00 | 14.85 |
| | | Aroma | 9.40 | 9.00 | 9.85 | 10.00 | 10.00 | 9.95 |
| | | Taste | 23.50 | 22.50 | 24.63 | 25.00 | 25.00 | 25.00 |
| | Subtotal of crumb | | 66.85 | 63.90 | 68.85 | 69.85 | 70.00 | 69.70 |
| | Total (overall) | | 96.18 | 92.00 | 98.45 | 99.80 | 100.00 | 99.70 |
| Compressibility | One day after baking | 1.5 mm | 131 | 119 | 123 | 110 | 102 | 112 |
| | | 2.0 | 155 | 141 | 149 | 130 | 120 | 130 |
| | | 3.0 | 186 | 170 | 181 | 156 | 144 | 153 |
| | Three days after baking | 1.5 mm | 235 | 199 | 213 | 192 | 174 | 189 |
| | | 2.0 | 275 | 236 | 249 | 224 | 207 | 220 |
| | | 3.0 | 316 | 280 | 294 | 264 | 246 | 259 |

| | | | Col1 | Col2 | Col3 | Col4 | Col5 | Col6 | Col7 | Col8 |
|---|---|---|---|---|---|---|---|---|---|---|
| Added amount of the yeast extract (%) | | | | 0.05 | | | | 0.075 | | |
| Added amount of the hydrolyzed egg white (%) | | | 0 | 0.5 | 1.0 | 1.5 | 0 | 0.5 | 1.0 | 1.5 |
| Marking in the Examination of the resulting bread | | Interior hue | 10.00 | 10.00 | 10.00 | 9.95 | 10.00 | 10.00 | 10.00 | 9.97 |
| | | Grain | 9.97 | 10.00 | 10.00 | 9.97 | 9.90 | 9.97 | 10.00 | 10.00 |
| | Crumb | Touch | 14.70 | 15.00 | 15.00 | 15.00 | 14.70 | 15.00 | 15.00 | 15.00 |
| | | Aroma | 9.90 | 10.00 | 10.00 | 9.95 | 9.90 | 10.00 | 10.00 | 9.90 |
| | | Taste | 24.75 | 25.00 | 25.00 | 25.00 | 24.75 | 25.00 | 25.00 | 25.00 |
| | Subtotal of crumb | | 69.32 | 70.00 | 70.00 | 69.87 | 69.25 | 69.97 | 70.00 | 69.87 |
| | Total (overall) | | 98.97 | 100.00 | 100.00 | 99.87 | 98.90 | 99.97 | 100.00 | 99.84 |
| Compressability | One day after baking | 1.5 mm | 110 | 104 | 96 | 105 | 107 | 106 | 97 | 99 |
| | | 2.0 | 135 | 120 | 117 | 123 | 131 | 117 | 115 | 118 |
| | | 3.0 | 166 | 147 | 134 | 146 | 161 | 144 | 138 | 141 |
| | Three days after baking | 1.5 mm | 212 | 180 | 165 | 180 | 202 | 178 | 164 | 178 |
| | | 2.0 | 246 | 211 | 187 | 212 | 237 | 207 | 193 | 210 |
| | | 3.0 | 287 | 250 | 227 | 251 | 274 | 248 | 229 | 249 |

5. Observation of the results

1. Property of dough

The yeast extracts have maturing effects on the dough. In accordance with the increase in the elasticity of the dough, it decreases in extensibility and resistance to extension when the yeast extract is added in an amount of 0.075% of the dough. On the other hand, the hydrolyzed egg white has tendency to increase the extensibility of dough. It is therefore possible to obtain a dough having good balance of elasticity with the extensibility by combining the yeast extract and the hydrolyzed egg white. The most desirable dough is obtained by using a combination range of 0.025 – 0.075% of the yeast extract with 0.5 – 1.5% of the hydrolyzed egg white. The dough subjected to sponge and dough fermentation for 3 hours with an addition of such a combination sample has exhibited superior physical properties to the dough subjected to 4 hour fermentation without addition of the combination sample. It is also apparent from the test that the yeast extract and the hydrolyzed egg white are effective for reducing the kneading time by the Farinograph test. It is also noted that the effect for reducing the oven time is remarkable.

2. Volume

Volume of dough increases gradually in accordance with the addition amount of the yeast extract. There is a remarkably large difference in volume between the control dough and the sample dough containing 0.025% of the yeast extract, with respect to sponge and dough fermentation for three hours.

The following is an observation in the case of the combination of the yeast extract and the hydrolyzed egg white.

Assume that the amounts of the hydrolyzed egg white to be added are the same. In the two cases wherein the hydrolyzed egg white is used in an amount of 0.5% and 1.0% respectively, there can be seen significant differences in volume of dough due to the differences between 0.025 and 0.05%, while there can scarcely be seen a difference in the volume of dough when the yeast extract is used in amounts of 0.05 and 0.075%. In the case wherein the hydrolyzed egg white is used in the amount of 1.5%, a peak of the volume of dough is shown at 0.05% of the yeast extract. The volume of dough in the use of 0.075% of the yeast extract is greater than that of 0.025%. Provided that the amounts of the yeast extract are same, there can be seen only a small difference in volume of dough, due to the difference of the amount of the hydrolyzed egg white in a range from 0.5 to 1.5%, in the case where the amount of said yeast extract is 0.025%. There cannot be observed a significant difference in volume of dough when said yeast extract is used in amounts between 0.05 and 0.075%. In any case, the peak is shown at 1.0% of the amount of said hydrolyzed egg white.

In any cases where the samples are added, there can be seen larger porosities or grains of dough in 12–55 than those of the control of sponge and dough fermentation for 4 hours, and in 51–96 than those of the control of sponge and dough fermentation for 3 hours.

3. Color of crust

Both the yeast extract and the hydrolyzed egg white have the effect of deepening the hue of the crust of bread in accordance with the increase of the amounts thereof added, but the addition of the latter affects the hue greater than that of the former. Addition of the samples gives a richer hue than that of the control.

4. Interior hue

Although the interior hue becomes a little brownish in accordance with an increase of the amount of the hydrolyzed egg white added, it is recognized that the hue is superior because the cell membrane of grain in the bread is spread thinly and has brilliance.

5. Grain

In accordance with increase of the amount of the yeast extract added, the cell size becomes greater, but the cell membrane tends to be thin.

On the other hand, the hydrolyzed egg white shows a tendency to give contrary effects in grain or porosity to said yeast extract.

In all cases wherein the samples are added, pores have thin cell membranes, and are more homogeneous and fine than the control, particularly the material of sponge and dough fermentation for 3 hours.

6. Touch

In all cases wherein the samples are added, the touch is remarkably improved as compared with the control.

7. Aroma

In all cases wherein the samples are added, there is provided strength of aroma correlated to change of hue of crust to brown. It is evident that the addition of said hydrolyzed egg white in amount of 1.5% gives a good aroma, although slightly excessive, by adjusting the braking conditions.

8. Taste

Taste provided by the addition of the samples has a quite different character from the light taste of the control. The former exhibits a much better flavor by synergism with a thick aroma.

9. Compressibility

Assume that the amounts of the hydrolyzed egg white added are same. The compressibility of the bread becomes to be little in accordance with an increase of the amount of the yeast extract in each case wherein said hydrolyzed egg white is added in amounts of 0%, 0.5% and 1.5%, respectively. In the case of the addition of 1% of said hydrolyzed egg white, the lowest compressibility is observed at 0.05% of the yeast extract, and slightly higher compressibility is observed at 0.075% of said yeast extract. Provided that the amounts of the yeast extract are same, the lowest compressibilities are observed at 1.0% of said hydrolyzed egg white in any case.

10. Combination of the yeast extract and the hydrolyzed egg white

Good results are shown in any case when the ratio of the amount of the yeast extract and the hydrolyzed egg white is in a range of 0.025 – 0.075% to 0.5 – 1.5%, and the most preferable ratio is 0.05% to 1.0%.

What is claimed is:

1. A process for the preparation of bread including the conventional steps of kneading, fermentation and baking, which comprises adding a mixture of a yeast extract selected from the group consisting of beer-yeast extract, sake-yeast extract, soy-yeast extract, and wine-yeast extract, and hydrolyzed egg-white to wheat flour, wherein the yeast extract is added in an amount from 0.025 to 0.075%, and the hydrolyzed egg-white is added in an amount from 0.5 to 1.5% on the basis of the amount of wheat flour.

2. The process according to claim 1, wherein the yeast extract is beer-yeast extract.

3. The process according to claim 1, wherein the hydrolyzed egg-white is selected from the group consisting of egg-white hydrolyzed with an acid and egg-white hydrolyzed with an enzyme.

4. The process according to claim 1, wherein the yeast extract is added in an amount of 0.05% and the hydrolyzed egg-white is added in an amount of 1.0%.

5. The process according to claim 1, wherein the yeast extract is added in an amount of 0.025%, and the hydrolyzed egg-white is added in an amount of 1.0%.

6. The process according to claim 1, wherein the yeast extract is added in an amount of 0.05%, and the hydrolyzed egg-white is added in an amount of 0.5%.

7. The process according to claim 1, wherein the yeast extract is added in an amount of 0.075% and the hydrolyzed egg-white is added in an amount of 1.0%.

* * * * *